3,332,512
SEISMIC EXPLORATION SYSTEM USING SEQUENTIALLY TRANSMITTED WAVE PACKETS
Peter C. Sundt, Houston, Tex., assignor to Mandrel Industries, Inc., Houston, Tex., a corporation of Michigan
Filed May 6, 1966, Ser. No. 548,325
13 Claims. (Cl. 181—.5)

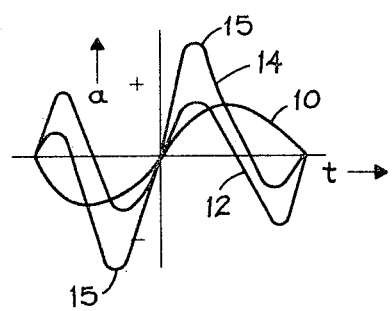
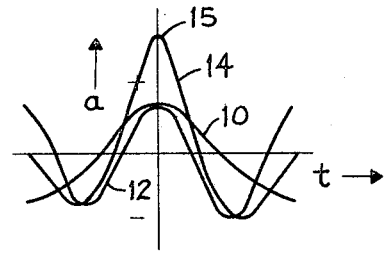
FIG_1A  FIG_1B
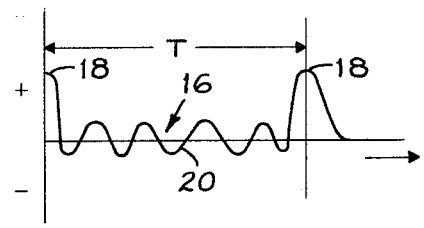
FIG_2
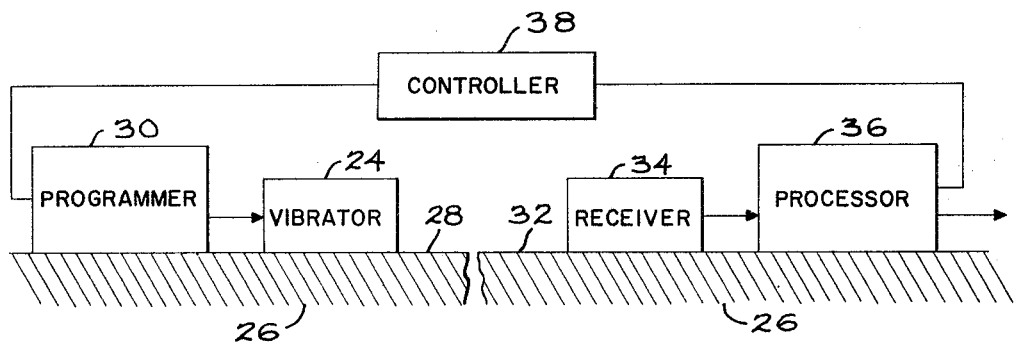
FIG_3
INVENTOR.
PETER C. SUNDT
BY Robert H. Clay
ATTORNEY

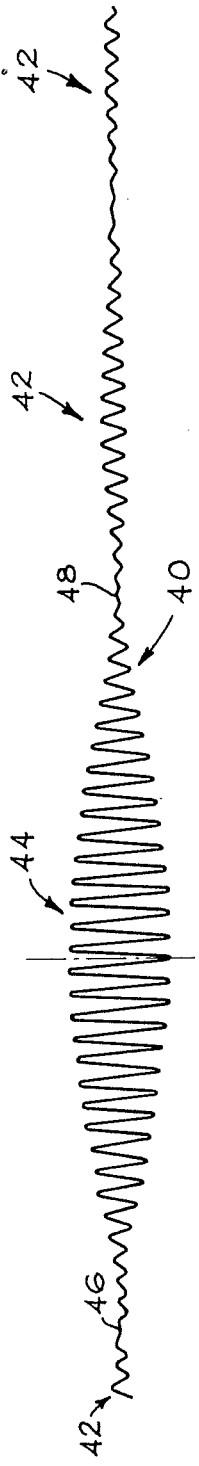
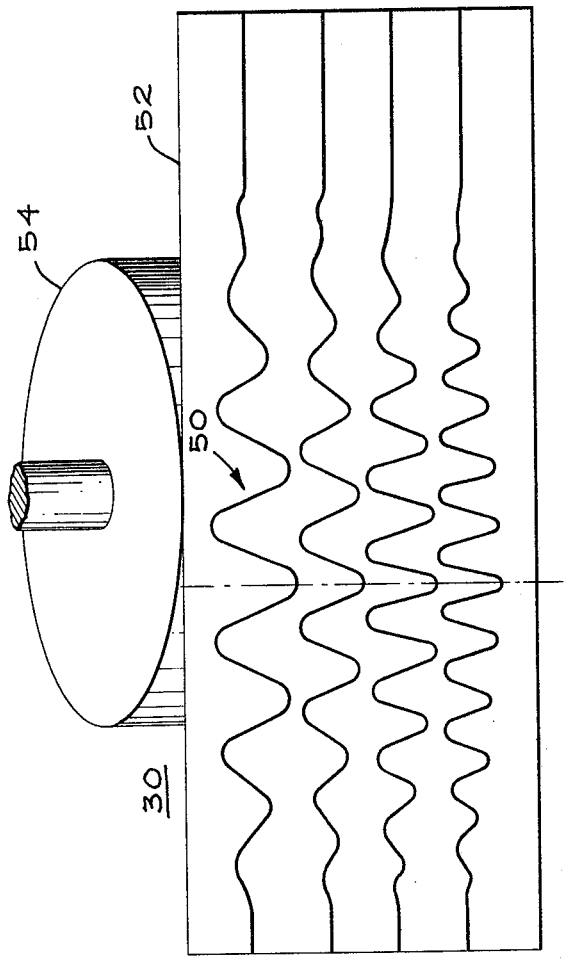

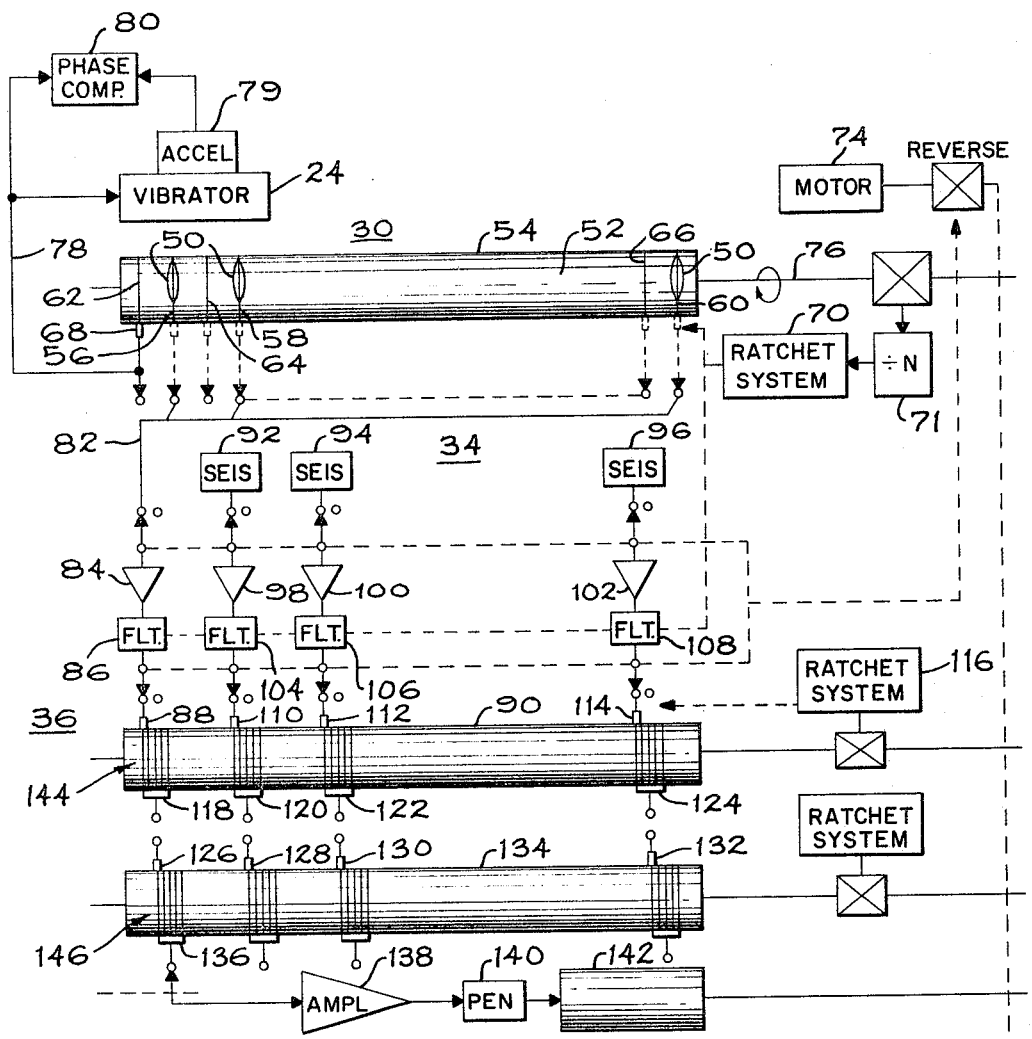
FIG_6

ABSTRACT OF THE DISCLOSURE

System for generating, transmitting and utilizing a sequence of special pre-formed vibratory wave packets, each of which comprises generally a summation, in phase, of a selected plurality of sinusoidal waves of a narrow group of successive frequencies and preferably although not necessarily of equal amplitudes, to provide the Fourier components of a seismic signal having a predominant pulse suitable for easy identification upon receiving and summing the transmitted packets.

CROSS-REFERENCES TO RELATED APPLICATIONS

This is a continuation-in-part application of a prior copending application Ser. No. 201,536 filed June 11, 1962, and now abandoned, and assigned to the same assignee as the present application.

The present invention relates to the use of vibratory waves for gathering information on the nature of a transmission medium located between two spaced points. Vibratory waves are used, for example, in the field of geophysical exploration, where seismic waves are transmitted to determine the geological structure of the ground. The technology of material testing and underwater measurement and detection, among others, also uses vibratory waves.

More particularly, the present invention is concerned with the transmission of a pulse of energy of selected composition between two points, for measurement and analysis.

In connection with the employment of the present invention in the field of geophysical exploration, which is the application chosen for illustrative purposes only, several aspects of the prior techniques should be at least briefly introduced. One of the main problems in conducting geophysical exploration is to impart sufficient energy to the ground to cause vibratory waves to reach the point of reception with sufficient energy. It has been the practice to utilize dynamite and other impulse producing devices to create the vibratory waves. Inherent in the use of dynamite has been the danger of premature explosion and the difficulties generally involved in drilling a hole in the ground in which to plant the dynamite. Typical systems for conducting geophysical exploration consist of devices for introducing a high energy pulse into the ground and means for processing the pulses received at a series of spaced receiving locations. Measurements are taken, including recording the time interval between the introduction of the pulse and the arrival time of the received pulses traveling along different paths and composite seismic records are made by combining the recorded measurements in various known manners to accent the desired signals and minimize the undesirable noise signals.

It is therefore an object of the present invention to provide an improved method and apparatus for generating controlled vibratory waves suitable for use in geophysical exploration and the like.

It is another object of the present invention to provide a method and apparatus for transmitting a seismic signal of unique composition to at least one spaced reception point and for receiving the unique signal with an improved high signal-to-noise ratio.

A further object of the invention is to provide an improved method and apparatus for generating a high energy seismic pulse from a plurality of relatively low energy vibrations, which preferably need not exceed the elastic limit of the ground.

It is a further object of the invention to provide an improved method for seismic exploration which provides rapid operation, narrow band filtering at the receiving point, and accurate control of the vibrator output, while avoiding overlapping strong and weak signals such as experienced in earlier methods, whereby the signal-to-noise ratio is inherently relatively improved.

It is yet another object of the invention to provide means for generating and radiating a seismic signal defined by a summation or "packet" of a plurality of sinusoidal waves of different frequencies or formed of a sinusoidal wave of a single frequency which is amplitude modulated to form the desired envelope shape, i.e., an envelope whose shape substantially describes a Gaussian form.

It is another object of the invention to provide means for generating and radiating seismic signals formed of a series of "packets" of different frequencies disposed in phase along a common line, each having a relatively narrow bandwidth, which when received can be filtered by respective corresponding narrow bandwidth filters to reduce random noise.

It is yet a further object of the invention to provide means for generating and radiating a series of pre-formed "muted packets" formed of only the most significant lobe, of a series of lobes, which "muted packets" resemble the Fourier addition of a plurality of sinusoidal waves having different frequencies, and which upon transmission define a series of downtraveling seismic waves.

It is another object of the invention to provide means for generating and radiating a series of pre-formed wave "packets" wherein the packets are each formed by amplitude modulation of a single frequency in such manner as to provide the optimum pulse approximating an envelope of Gaussian form for a given bandwidth.

It is still another object of the invention to provide an apparatus and method for receiving a reflected plurality of radiated wave "packets," and for combining the wave "packets" in phase to provide a composite seismic record.

Other objects and advantages will be apparent from the specification taken in conjunction with the drawings in which:

FIGURES 1a and 1b are graphic illustrations of the composition of a main wave produced by adding the Fourier components; FIG. 1a shows the addition of sine waves with zero phase displacement and FIG. 1b shows the addition of cosine waves with zero phase displacement.

FIGURE 2 illustrates a composite output signal formed in accordance with the invention concepts wherein the Fourier components are cosine waves;

FIGURE 3 is a simplified block diagram illustrating the basic apparatus for carrying out the method of the present invention;

FIGURE 4 is a graphic representation exemplifying a single wave "packet" formed by pre-summing a group of Fourier components or by amplitude modulation of a single frequency in accordance with the invention;

FIGURE 5 is a simplified pictorial view illustrating one embodiment of a drum programmer for generating program signals, wherein the recording surface is shown unfolded in a flat position prior to being wrapped around a support drum;

FIGURE 6 is a circuit block diagram illustrating one embodiment of a complete system for transmitting a pulse through the ground and processing the received signal in accordance with the present invention.

Generally stated, the present invention comprises as a primary concept the generation and transmission of a sequence of vibratory waves, herein termed wave "packets" from a first or transmitting point, and their reception at a second or receiving point spaced therefrom. The vibratory waves or wave packets comprise a summation, in phase, of a plurality of sinusoidal waves of different frequencies and preferably although not necessarily of equal amplitudes, to provide the Fourier components of a seismic signal having a predominant pulse suitable for easy identification and measurement. The packets may travel several paths of different lengths in reaching the receiving point. At the receiving point, the reflected packets are preferably temporarily stored by various systems, an example of which is herein described, and are then summed to form a received composite main wave or composite seismic record composed of a pulse for each packet travel path as it is reflected from each reflecting sub-surface while passing between the first location and the receiving point. Accordingly, each transmission of the packets produces a selected plurality of incoming waves at the receiver that have followed paths of different lengths from the transmitting point. Thus, the output of the receiver for each transmission is a signal that is the combination of the individual signals produced by the vibratory waves received from each path. After each of the packet transmissions have been received, the intermediate signals are added to form a received main wave having a series of predominant pulses corresponding to the reflecting subsurfaces, which pulses result from the transmission of the wave packets of the invention. The received pulse that occurs first in time is formed from the addition of the portion of the intermediate signals corresponding to wave packets transmitted on the shortest path between the transmitting and receiving points, the second occurring pulse is the result of transmission over the next shortest path, and so on.

In the following description it will be assumed except where otherwise stated, that there is only one path between the transmitting and receiving points and only one reflecting subsurface strata. With this assumption, the intermediate signal from the receiver will be produced by packets transmitted over one path and only a single predominant pulse will appear in the received main wave for each predominant pulse in the transmitted main wave. It must be recognized that in all respects, the present invention is fully capable of operation with multi-paths between the transmitting and receiving points wherein reflections occur from several subsurface layers of varying depth, and the above assumption is made to simplify the explanation of the illustrated method and apparatus of the invention.

Before going into the details of the method and apparatus of the present invention, it is beneficial to review for a moment a mathematical relationship that underlies the operation of the present invention. It is a well-known fundamental of mathematics that a periodic function can be expressed in terms of a Fourier series. A Fourier series is defined as an infinite series of sinusoids of frequencies which are integral multiples of a fundamental frequency. These functions or the combinations thereof are referred to herein as Fourier components. Perhaps the most common form in which the Fourier series representation of a periodic non-sine wave is given is:

$$i(a) = i_{co} + i_{c1} \cos a + i_{c2} \cos 2a + i_{c3} \cos 3a + \ldots$$
$$+ i_{s1} \sin a + i_{s2} \sin 2a + i_{s3} \sin 3a + \ldots \quad (1)$$

or in a more compact representation:

$$i(a) = i_{oo} + \sum_{k=1}^{\infty} (i_{ck} \cos ka + i_{sk} \sin ka) \quad (2)$$

The coefficients $i_{co}$, $i_{ck}$, and $i_{sk}$ are real and may be positive, negative or zero. The periodic wave which the series represents determines these coefficients.

An alternative form of this last equation, which is useful for many purposes, can be written immediately from the relation:

$$i_{ck} \cos ka + i_{sk} \sin ka = |I_{mk}| \cos (ka + \phi_k) \quad (3)$$

where $$|I_{mk}| = \sqrt{i_{ck}^2 + i_{sk}^2}$$

$$\phi = \tan^{-1}\left(\frac{i_{sk}}{i_{ck}}\right)$$

$$i_{ok} = |I_{mk}| \cos \phi_k$$

$$i_{sk} = |I_{mk}| \sin \phi_k$$

Equation 2 becomes on using these relations:

$$i(a) = i_{oo} + \sum_{k=1}^{\infty} |I_{mk}| \cos (ka + \phi_k) \quad (4)$$

The maximum value and the phase of each harmonic, with respect to the $t=0$ point, are given explicitly by Equation 4. For interpretation purposes, therefore, this last equation is usually more useful than Equation 2. For further information on the fundamental mathematics of the Fourier series, reference is made to the text, Mathematical Methods in Electrical Engineering, by Myril B. Reed, and Georgia B. Reed, Harper & Brothers, New York, 1951, Chapter 7.

Looking at Equation 4, it can be seen that a periodic function may be made up of a direct current component $i_{oo}$ and a variable function comprising a number of cosine waves with individual maximum amplitudes and phase relationships with respect to a $t=$zero point. Thus, any periodic function may be reproduced by combining the individual Fourier components in the proper phase relationship.

FIGURES 1a and 1b are simple illustrations two Fourier components 10 and 12 added together to form a main wave 14. The Fourier components 10 and 12 in FIGURE 1a are sinusoidal waves with zero phase displacement, i.e., there is a common point where the Fourier components pass through zero (these waves are herein termed sine waves). In FIGURE 1b the sinusoids have a maximum amplitude along a common line (these waves are herein termed cosine waves). For convenience in terminology, the term sinusoid is used as generic to cosine and sine waves to identify a sinusoidally varying function without reference to phase at a common $t=$zero point. Fourier component 12 is herein taken as the second harmonic of the fundamental Fourier component 10.

It can also be seen, in FIGS. 1a and 1b, that the main wave 14, resulting from the addition of the two Fourier components 10 and 12 tends to have a sharp rising predominant pulse indicated at 15 formed by the addition of the Fourier components 10 and 12. By properly choosing the amplitude, frequency and phase relationship of the sinusoids, it is possible to produce a very distinct and easily recognizable predominant pulse or wavelet in the main wave. The predominant pulse in FIG. 1a, wherein sine waves are added, repeats twice in the period of the fundamental Fourier component; once as a positive pulse and again as a negative pulse. In FIG. 1b the predominant pulse repeats only once in the period of the fundamental Fourier component. Thus, the main wave 14 consisting of cosine wave Fourier components produces uni-directional pulses, while the sine wave Fourier components produce a main wave 14 having bi-directional pulses. Also, the repetition rate of predominant pulses in the main wave 14 consisting of cosine waves as the Fourier components is one-half the repetition rate of the predominant pulse rate when sine waves are the Fourier components of the main wave.

A main wave formed by the preferred cosine wave Fourier components is illustrated in FIG. 2, wherein the main wave 16 includes the repeating predominant pulse 18 occurring with a period T, corresponding to the fundamental frequency of the Fourier components. Since each of the Fourier components is a cosine wave, i.e., each of the Fourier components has a maximum amplitude in one direction at the same point on the time scale, the very sharp predominant pulse 18 is produced at the point of the maximum amplitude for the Fourier components, and substantially no other predominant repetitive pulse is produced during the period of the fundamental Fourier component. The main wave 16 also has a small size periodic variation 20 which is formed by the incomplete cancellation of the Fourier components along the remaining period.

Briefly the present invention applies the technique of individually transmitting a series of packets, each formed of a group of waves of different frequencies or of a single amplitude modulated wave, wherein each packet has an average or mid frequency differing from the successive packets' average frequencies. The resulting transmitted packets are selected such that upon summation the resulting record has an easily identified, predominant pulse or wavelet (e.g. pulse 18 of FIGURE 2) that repeats at the period of the fundamental Fourier frequency chosen to form the packets. By transmitting each of the packets of summed frequency waves a number of times, the pulse or wavelet energy received is significantly greater than the energy of any of the individual waves that are transmitted. Thus, a very strong pulse, such as that indicated by numeral 18 of FIGURE 2, may be realized at the receiving end when properly combined, as will be described hereinafter. Transmitting a plurality of relatively narrow bandwidth packets rather than the entire selected bandwidth of frequencies, provides the advantage of being able to employ narrow bandwidth filters corresponding to the bandwidth of the respective packet frequencies, to thus allow selective filtering of the returning signals and an improved signal-to-noise ratio. Other advantages to the use of the Fourier components, as opposed to the generation and transmission of a high energy short-duration pulse such as produced with a dynamite charge or seismic weight, will be evident further on.

In considering the application of the Fourier technique to the geophysical exploration field, by way of illustration only, frequencies below approximately 10 cycles, are not easily produced or coupled to the ground with sufficient energy content to be of interest, due to inherent deficiencies of most vibrators. In addition, these frequencies are not transmitted by the ground as well as, for example, 20 c.p.s. to 40 c.p.s. frequencies. On the other side of the frequency range, the ground does not transmit frequencies above approximately 100 cycles for any appreciable distance. This means that between approximately 10 and 100 cycles and preferably between 5 and 70 cycles, a sufficient number of Fourier components must be chosen to extend over the entire selected bandwidth, and the packets resulting therefrom are transmitted to reconstruct the main wave at a distant location. Accordingly, since the fundamental Fourier component is generally chosen within the range of, for example, ⅛ cycle to 1 cycle per second, such a fundamental Fourier component is not itself generated and/or transmitted. Only the higher order Fourier components within the above bandwidth are actually transmitted.

The predominant pulse for a given bandwidth, formed as previously described by adding cosine waves, can be generally expressed in terms of a Fourier transform curve (not shown) which compares the relative amplitudes of each Fourier component of the predominant pulse for a range of frequencies starting at zero and extending beyond 100 cycles per second. It may be seen that the shape of the predominant pulse can accordingly be varied by altering the amplitudes of the cosine wave Fourier components, as well as the lowest and highest frequencies of the range of frequencies transmitted. A sizeable portion of the Fourier components may be transmitted between limits $F_1$ and $F_2$, referred to as the recipe for the main wave, wherein the limits $F_1$ and $F_2$ correspond generally to those previously mentioned limits of 5 and 70 cycles. Thus, a preferred predominant pulse shape can be realised by varying the characteristics of the Fourier components. For example, since the higher frequencies of the recipe are strongly attenuated by the ground during transmission, such frequencies can be strengthened by increasing their amplitudes. On the other hand, since the ground attenuates the higher frequencies and the equipment generally does not generate the lower frequencies, it may be preferable to form the packets of those frequencies intermediate of the above limits $F_1$ and $F_2$ which are defined by the recipe.

By way of example only, the method of the invention utilizes preferably a hydraulically operated mechanical shaker or vibrator in place of the conventional dynamite explosions to generate seismic pulses, or energy waves, which are radiated into the earth. Since the vibrator generates seismic waves of considerably less energy than those of a dynamite explosion it is necessary to generate and radiate a large number of the waves in sequential fashion and under carefully controlled conditions of phase and frequency. Additionally, optimum and thus obviously preferred results are obtained by radiating into the ground a plurality of the "packets" of the invention, with their unique characteristics.

To simplify the description of the method, numerical values of the frequencies, numbers of packets, numbers of channels, etc., will be employed herein, but by way of example only. It is to be understood that various numbers of packets and channels as well as values of frequencies can be used in place of, or in addition to, those herein specifically set forth.

Briefly, referring to FIGURE 3 there is shown in block diagram, apparatus for performing the method of the invention, comprising a vibrator 24 disposed on the ground 26 at a transmitting point 28 and coupled at its input to a programmer 30. Disposed on the ground 26 at a receiving point 32 spaced from the transmitting point 26, is a receiver 34 and a processor 36 connected thereto. A controller 38 interconnects the programmer 30 and the processor 36 for coordination of the apparatus. That is, the controller 38 represents various automatic or manual apparatus utilized to coordinate the apparatus of FIGURE 4 and particularly to define and control the operational sequence and timing of the packet transmissions.

Accordingly, since the vibrator 24 introduces the seismic waves into the ground, it must be actuated in accordance with the characteristics of the above-mentioned packets. Thus, by way of example only, eight (unmuted) packets are formed, each packet being formed by adding together, in a true Fourier summation, 15 steady-state cosine waves of equal amplitudes and 15 frequencies, chosen at ¼ cycle intervals. The waves are phased by disposing a wave peak of each wave along a common line, as previously described in conjunction with FIGURE 1b. For example, packet 1 is formed by adding together in proper phase, 15 successive Fourier component waves preferably of equal amplitudes starting with a wave of for example, 10 cycles/second, and continuing with 10¼, 10½, 10¾, 11, 11¼ cycles/sec., etc., up to and including 13¾ cycles/second. Packet 2 is formed starting with a cosine wave of 14 cycles/second, added to 14 additional waves and including the wave of 17¾ cycles/second; and so on up to packet 8. The frequency of each packet is the average frequency of the narrow band of frequencies summed in each.

FIGURE 4 shows an example of an "unmuted packet" 40 formed in accordance with the invention. A true Fourier summation of each of a series of such packets in accordance with the expression $$F(t) = \sum_{n=10}^{n=38} A_n \cos 2\pi n f_o t$$

utilizing a basic fundamental frequency of ¼ cycle/ second, (i.e. a packet cycle or Fourier cycle which repeats every seconds), provides an unmuted packet envelope composed of a series of secondary lobes 42 of varying amplitudes, with one major lobe 44 of relatively larger amplitude than that of the others. By truncating, or muting, each of the eight (unmuted) packets at such time as the packet values at either side of the major lobe are at zero, such as indicated at points designated by numerals 46 and 48, there are provided eight muted packets, each having a duration of only a fraction of the overall unmuted packet duration of 4 seconds such as used herein as an example of the full Fourier cycle. Each muted packet thus contains no adjacent secondary lobes 42 and accordingly no undesirable secondary lobe noise. The eight muted packets are each recorded onto a program drum of the programmer 30 in proper phase relation.

FIGURE 5 shows a suite of 4 muted wave packets 50 exemplifying their disposition on a tape which can be wrapped around a program drum 54 of the programmer 30. The packets 50 are preferably recorded by utilizing the above-noted equation, and by plotting by means of a computer the value of the function for every millisecond over a period of time. The computer output is recorded on digital tape, and thereafter transferred to analog tape, which is wrapped around the program drum 54 of above mention, and used to program the vibrator 24 operation.

The muted packets obtained in the above manner comprise the best possible pulse for transmission into the earth as seismic pulses since the packets are a true Fourier summation of composite cosine waves of selected amplitudes and of a plurality of different frequencies combined under exacting phase conditions.

However, it is to be understood that the packets can also be formed by selecting a frequency (or eight different successive frequencies in the above example) and amplitude modulating each of the 8 frequencies to form of each a respective packet envelope, as shown for example in FIGURE 5. The frequency chosen for each of the packets would be for example, the afore-mentioned average frequency of each of the eight packets. More particularly, the frequency would be amplitude modulated in such a manner as to obtain the optimum pulse for a given bandwidth, which optimum pulse is defined by a modulation envelope approaching the form of a Gaussian curve.

The apparatus shown in FIGURE 6 exemplifies one embodiment for carrying out the method of the present invention. As in FIGURE 3 the major parts of the system consist of the vibrator 24, the programmer 30, the receiver 34, herein depicted as a series of seismometers further described hereafter, and the processor 36 defining generally the major portion of the circuit of FIGURE 6.

Briefly, with particular reference to the programmer 30 that generates the program signals for controlling the vibrator 24, the series of muted wave packets 50 are pre-recorded on a recording medium 52 comprising a magnetic recording medium, or the like, circumferentially disposed around the cylindrical program drum 54 of previous mention.

A separate packet is recorded on program drum 54 in each of the (three) tracks 56, 58 and 60 and the midwave or average frequency wave of previous mention corresponding to each packet is recorded in each of the three tracks 62, 64 and 66, immediately prior and adjacent the packets in tracks 56, 58 and 60 respectively. The average frequency wave is used to phase the vibrator 24, and the respective packet transmissions as further described infra. The program drum 54 has an associated recording-playback head 68 with moveover mechanism (not shown) disposed to move along the drum 54 as desired to reproduce the packets and sine waves on the plurality of tracks. It is to be understood that many more tracks than are shown may be placed on the program drum 54, notwithstanding that the present invention is herein described with reference to the particular embodiments of 8 packets only. The moveover mechanism is driven by a ratchet system 70 which is in turn coupled to, and is rotated by, the rotation of the program drum 54 via an adjustable divider mechanism 71. Thus the head 68 is sequentially stepped through the series of tracks at a rate and sequence determined by the divider 71 and the speed of rotation of drum 54. The program drum 54 is axially rotated by a motor 74 through a drive shaft 76. Each of the pre-recorded muted packets on tracks 56–60 are positioned about the circumference of program drum 54 in a phased relationship along a common axially extending line as heretofore described in FIGURE 5. Thus the individual packets have a common time base whereby if they are graphically and electrically added along the time base, the main wave 16, FIGURE 2, would be formed having a predominant pulse 18. The signal or packet from each track is played out through the stepping recording-playback head 68 disposed in relative axial alignment against the progrm drum 54 and, via a line 78 which may extend for example to a vibrator truck (not shown) the reproduced signal is introduced to the vibrator 24 to operate same in accordance with the particular sine wave or packet being read by the head 68. At such time as the head 68 is reproducing the packet in track 56, the head is also connected via a line 82 to an amplifier 84 and filter 86 and from thence to a reference track head 88 disposed against a recording drum 90.

To provide for properly phasing the vibrator 24 an accelerometer means 79 is coupled to the vibrator 24 to sense the movement and thus the phase thereof, and is in turn connected to a phase comparator means 80 which is also connected to the line 78 from the head 68. Thus the phase of the signal generated by the vibrator 24 may be compared with the phase of the signal from the head 68 to obtain a correction value equal to any error therebetween, whereby the position of head 68 is adjusted along the circumference of the drum 54 to compensate for and cancel such phase error between signals.

The receiver 34 is herein depicted as a plurality of seismometers 92, 94, and 96, and could be any number of seismometer patches as commonly used in the art. The seismometers 92, 94 and 96 are respectively connected to amplifiers 98, 100 and 102 and filters 104, 106 and 108 serially connected therewith, and from thence to magnetic heads 110, 112 and 114 respectively. The recording drum 90 may be formed of a magnetic, electric, a deformable surface, or the like, capable of recording the signal from a corresponding type of head adapted to record upon the particular medium.

It is to be understood that although the muted wave packets of associated tracks 56–60 are shown recorded on program drum 54, these could be replaced if desired by the corresponding unmuted wave packets containing the secondary lobes 42 as exemplified in FIGURE 4. The vibrator 24 would then be energized in accordance with the full Fourier cycle of the unmuted wave packets. It should be noted that the packets 50 are herein formed of cosine waves as heretofore described in FIGURE 1b and thus produce a single predominant pulse when added together, which pulse repeats at the period of the fundamental of the Fourier components recorded on the recording medium 52. Accordingly, rotation of the drum 54 against the head 68 will produce a periodic repetition of the respective packet against which the head is disposed with a rotational period equal to the period of the fundamental frequency of the particular Fourier cycle chosen. Although not specifically shown it is recognized that the position of the recording-playback head 68 adjacent the programmer drum is circumferentially adjustable to allow translation of the position of the head along the circumference of the drum 54 to vary the phase of the transmitted signal.

The heads 88, 110, 112 and 114 are axially translatable by a moveover mechanism (not shown) whereby they may be stepped a number of times to record a plurality of micro-tracks along the recording drum 90. In the example hereinbefore presented, the packets are each transmitted 10 times to build up the signal; accordingly, 10 micro-tracks are recorded by each of the heads 110, 112 and 114 on the recording drum 90. The heads are stepped by means of a ratchet system 116 coupled thereto and similar in function to the ratchet system 70.

A plurality of "wide" magnetic heads 118, 120, 122 and 124 are disposed against the circumference of the recording drum 90 and are of sufficient width to cover and thus reproduce the groups of ten micro-tracks in each of the groups recorded by the "narrow" heads 88-114. The wide reference track head 118 and heads 120-124 are coupled via suitable circuitry (not shown but which includes the amplifier-filter circuits of previous mention) to a like plurality of heads 126, 128, 130 and 132 respectively which are disposed against the circumference of a transfer drum 134 having disposed thereon a suitable recording media corresponding to that of drum 90. Head 126 comprises a reference track head.

A wide head 136 is disposed against the circumference of the transfer drum 134 and is adapted with a moveover mechanism (not shown) whereby it may be axially stepped along the circumference of the transfer drum 134. The wide head 136 is adapted to simultaneously reproduce in sequence, each of the groups of micro-tracks recorded by each of the heads 126–132 including the reference track. The head 136 is connected to an amplifier 138 and from thence to a pen stylus 140 which is adapted to reproduce the incoming signal from the head 136 on the graph paper of a monitor drum 142.

The recording drum 90, the transfer drum 134 and the monitor drum 142 may be coaxially coupled together and from thence to the motor 74 whereby the drums are rotated together at the same speed.

The operation of the arrangement shown in FIG. 6 may be described by beginning with the first transmission to the receiver 34. Motor 74 simultaneously rotates the program drum 54, recording drum 90, transfer drum 134 and monitor drum 142, at the period of the fundamental Fourier frequency, or a harmonic of the fundamental Fourier frequency, which is recorded on the program drum 54. The mid-wave or average frequency wave 62–66 of each muted packet 50 is introduced to the vibrator 24 to activate same prior to transmitting the packet itself, and is used to properly phase the vibrator 24 with respect to each packet. Then each muted packet 50 is individually repeatedly introduced to the vibrator, say for example, 10 times, thereby transmitting each packet into the earth a like number of times to build up the recorded signal. The muted packet is likewise introduced directly to a reference track 144, on the recording drum 90 upon which drum all the returning seismic waves are to be temporarily recorded as hereafter described. The vibrator 24 is phased as heretofore mentioned by introducing the (average) sine wave in tracks 62–66 to the vibrator and adjusting the head 69 against the drum 54 to compensate for any errors sensed by the phase comparator 80. It is noted that each transmission of the muted packet is reflected by the various reflectors of the substrata and received and recorded on the recording drum 90 prior to the next transmission of the same packet. Thus, the reason for utilizing a fundamental Fourier component of ¼ cycle and thus the four second intervals between packet transmissions in the previously noted example; to allow time for the transmission traveling along the longest path to be reflected and received prior to the next packet transmission.

The muted packets are introduced into the earth via action of the vibrator 24, are reflected in the usual manner from the various substrates, and are detected by the plurality of seismometers 92–96 disposed in a generally conventional pattern on the earth's surface, and which are depicted generally herein as the receiver 34. As described in the example, the method preferably utilizes for example, 12 seismometer groups, and each will introduce the reflected seismic waves into a separate respective channel of the receiving and processing system which is composed accordingly of 12 separate but similar channels as exemplified by only 4 channels in FIGURE 6.

The signal to each channel is amplified by the amplifiers 98–102, filtered by the narrow band filters 104–108 having a bandwidth corresponding to the bandwidths of the respective, transmitted packets, and each channel signal is recorded and processed as further described hereinbelow via the "narrow" heads 110–114 in separate micro-tracks on the recording drum 90 of previous mention. Each of the 10 transmissions of the packets is recorded via 12 channels in respective micro-tracks on the recording drum 90. Thus, after 10 transmissions of the packet in track 56, there are recorded on the recording drum 90, 12 groups of 10 tracks each; each group containing 10 repetitions of essentially the same information obtained from each of the 12 seismometer groups. Thereupon, the recording drum 90 is rotated backwards and each group of 10 micro-tracks is simultaneously scanned by respective "wide" heads 120–124 thereby adding the 10 micro-tracks of each group together whereupon resulting summations of each of the 12 groups of tracks are separately transposed to 12 respective micro-tracks on a second rotating drum; viz, the transfer drum 134. The recording drum 90 is rotated backwards during the transposing process to send the summed signals back through the amplifier-filter circuit to cancel the phase shift introduced to the originally received signals by the amplifier-filter circuits. The signals recorded in the reference tracks 144 are added via head 118 and recorded via head 126, in a reference track 146 of drum 134.

At this stage of the method operation, the recording drum 90 is erased and the transfer drum 134 has 12 groups of one micro-track each of information from the transmission of the first muted packet. Thereafter, the second packet which is recorded in track 58 is sequentially introduced to the vibrator 10 times at four second intervals, and is recorded at 12 groups of 10 tracks each on the recording drum 90. The drum 90 is again rotated backwards and the 10 tracks are summed by means of the (12) wide heads herein exemplified by wide heads 120–124, and are recorded on the transfer drum 134 as the second micro-track adjacent the first micro-track of each group of micro-tracks. The process of recording and transposing is continued for all 8 muted packets until finally the transfer drum 134 contains 12 groups of 8 adjacent micro-tracks of received information. At this time a movable wide head 136 sequentially scans and thus adds each group of 8 micro-tracks on the transfer drum 134, and introduces the summed information from each of the 12 groups via the amplifier 138 and pen stylus 140, to 12 tracks on the monitor drum 142 of the oscillograph device, which visually reproduces the 12 channels, (each having the summation of the 8 sequentially radiated, muted packets of information) as 12 wiggle-traces disposed side-by-side on the graph paper of the monitor drum 142. In addition, a time reference signal or trace is drawn along the graph paper of the monitor drum 142 adjacent the wiggle-traces and is the sum of the muted packets 50 recorded directly from the program drum 54, and which is obtained via line 82, amplifier 84, filter 86, reference track head 88, wide head 118, reference track head 126, and wide head 136 which adds the packet transmissions. The object of summing the same signals directly from the vibrator 24 without passing them through the group is to create a time break or a reference signal which provides the zero time base by which processing of the seismic data recorded on the monitor drum graph paper is conducted.

It is to be noted that the information recorded in the plurality of tracks of the transfer drum 134 is the total composite information obtained from a complete survey although the groups of tracks have not been finally summed as by means of the head 136. Accordingly, the recording medium disposed about the drum 134 and containing the tracks is the recording which is used in data processing systems for assimilating the information taken by the survey method, such as commonly known in the art.

A number of alternative arrangements will readily suggest themselves to those skilled in the art. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A method for determining the travel time of vibratory waves formed of a predetermined composite bandwidth of frequencies which are transmitted between spaced-apart first and second points comprising the steps of:
   (a) forming a wave packet prior to transmission thereof, said wave packet defining the true summation of a group of successive Fourier components extending over a preselected bandwidth of frequencies and having a fundamental frequency to provide a packet envelope having a major lobe and a plurality of secondary lobes, said preselected bandwidth of frequencies defining a relatively narrow group of successive frequencies chosen from said composite bandwidth of frequencies;
   (b) transmitting a selected duration of the wave packet a selected plurality of times from said first point to generate the vibratory waves;
   (c) recording each transmission of the wave packet as it is received at the second point;
   (d) summing the plurality of recordings of the packet received at said second point to multiply the strength of the transmission and increase the $S/N$ ratio, and to form therefrom a received main wave having at least one predominant pulse repeating at the fundamental frequency; and
   (e) recording the received main wave summation.

2. The method of claim 1 further comprising the step of, muting the wave packet at such time as the values of the wave pass through zero at either side of the major lobe to eliminate the secondary lobes and retain only the major lobe of the wave packet envelope.

3. The method of claim 1 wherein a preselected series of said wave packets are formed prior to transmission thereof, wherein each wave packet encompasses a respective relatively narrow group of successive frequencies chosen from and defining said composite bandwidth of frequencies; wherein each of the series of wave packets are sequentially transmitted the selected plurality of times from said first point;
and wherein the recorded summation of each packet of the series of wave packets are further added to form therefrom a final received main wave having at least one predominant pulse.

4. The method of claim 3 further comprising the step of, muting each of the series of wave packets while forming the packets prior to transmission thereof to eliminate the secondary lobes and retain the major lobe of each wave packet envelope, each of the series of muted wave packets being disposed in phase with one another.

5. The method of claim 3 wherein each of the packets of said series of wave packets is formed by summing in phase a selected succession of Fourier components each succession of which defines one of said relatively narrow groups of frequencies, said components having selected amplitudes to provide the optimum pulse for said composite bandwidth of frequencies.

6. The method of claim 3 wherein each of the packets of the series of wave packets are formed by amplitude modulation of a single average frequency defining the mid frequency of said selected bandwidth to provide the optimum pulse for the composite bandwidth, wherein the wave packets each have modulation envelopes approximating the envelope generated by said summation of successive Fourier components in said narrow groups.

7. The method of claim 3 wherein the wave packets are formed to define a steady-state phase relationship of said recorded wave packets with respect to each other such that upon summation the Fourier components have substantially maximum amplitudes at that point along the packet duration when said predominant pulse is generated.

8. The method of claim 7 wherein each of said wave packets are formed of a group of Fourier components wherein the packet corresponding to the lowest frequency group of the composite bandwidth has a minimum frequency at least ten times greater than the fundamental frequency, and the remaining successively higher frequency packets are selected from the remaining composite bandwidth of frequencies, and said packets are transmitted sequentially in said form of the wave packets.

9. The method of claim 8 wherein the wave packets are transmitted by a wave source from the first point further comprising the step of, energizing the wave source in response to the series of pre-formed wave packets to produce from said first point the sequential succession of vibratory waves corresponding to the form of the wave packets.

10. The method of claim 4 wherein said muted wave packets are each formed by summing in phase the successive Fourier components of the respective relatively narrow groups to provide upon summation of the received signals at said second point the optimum pulse, wherein the envelope of said wave packets each substantially describe a Gaussian form.

11. The method of claim 4 wherein each of the packets of said series of muted wave packets are formed by amplitude modulation of a single average frequency defining the mid frequency of said selected bandwidth to provide the optimum pulse for the composite bandwidth upon summation at the second point, wherein the muted wave packets each have modulation envelopes which substantially describe a Gaussian form.

12. The method of claim 4 further comprising the steps of, recording said series of muted wave packets in phase on a recording medium, and energizing said wave source in response to the recorded series of muted wave packets to produce a series of vibratory waves at said first point each having a duration equal to a fraction of the cycle of the fundamental Fourier component.

13. The method of claim 12 wherein said wave packets are formed from a preselected bandwidth chosen from within a range of frequencies from 5–70 cycles/second, and said fudamental frequency is chosen from within a range of from ⅛–1 cycle/second.

References Cited

UNITED STATES PATENTS

| | | | |
|---|---|---|---|
| 2,156,198 | 4/1939 | Scherbatskay | 181—.5 |
| 2,320,248 | 5/1943 | Shimek | 181—.5 |
| 3,182,743 | 5/1965 | McCollum | 181—.5 |
| 3,185,250 | 5/1965 | Glazier | 181—.5 |
| 3,259,878 | 7/1966 | Mifsud | 181—.5 X |
| 3,274,542 | 9/1966 | Ruehle | 181—.5 X |

BENJAMIN A. BORCHELT, *Primary Examiner.*

R. M. SKOLNIK, *Assistant Examiner.*